(12) United States Patent
Lu (10) Patent No.: US 7,181,491 B2
(45) Date of Patent: Feb. 20, 2007

(54) INTELLIGENT DATA POOL MANAGEMENT ENGINE

(75) Inventor: Ying-Lon Lu, Kaoshiung (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 635 days.

(21) Appl. No.: 10/406,896

(22) Filed: Apr. 4, 2003

(65) Prior Publication Data

US 2004/0215789 A1    Oct. 28, 2004

(51) Int. Cl.
*G06F 15/16* (2006.01)
(52) U.S. Cl. .................. 709/203; 709/224; 709/229
(58) Field of Classification Search ........ 709/200–203, 709/217–226, 229; 707/10
See application file for complete search history.

(56) References Cited

U.S. PATENT DOCUMENTS

| | | | |
|---|---|---|---|
| 5,452,445 A * | 9/1995 | Hallmark et al. | 707/2 |
| 6,519,233 B1 * | 2/2003 | Gutierrez | 370/320 |
| 2002/0004796 A1 * | 1/2002 | Vange et al. | 707/10 |
| 2002/0087661 A1 * | 7/2002 | Matichuk et al. | 709/218 |

* cited by examiner

*Primary Examiner*—Moustafa M. Meky
(74) *Attorney, Agent, or Firm*—Duane Morris LLP (57) ABSTRACT

A method of managing access by a plurality of clients to a plurality of respectively different databases comprises the steps of: receiving a plurality of requests by the plurality of clients to access a plurality of different databases, the queries being received by a single application server; dynamically analyzing use of channel connections between the single application server and the plurality of databases; and dynamically allocating the channel connections between the single application server and each of the plurality of databases to service the plurality of queries based on the analyzing.

27 Claims, 7 Drawing Sheets

FIG. 7

INTELLIGENT DATA POOL MANAGEMENT ENGINE

FIELD OF THE INVENTION

The present invention relates to software generally, and more specifically to database management systems employing the three-tier model.

BACKGROUND

In a traditional three-tier architecture, many clients can connect to the same application server to access a database. The components, drivers and database link setup are only required to be installed on the computer where application server exists. This reduces the number of computers for information technology staff to install and maintain. However, the traditional model for a multi-tier application server connecting to a plurality of databases is one-to-one. For each backend database, there is a corresponding one or more application servers. Each application server can has a respective channel. This architecture consumes many hardware and software resources. When a client connects to one of the databases, the connection setup consumes a great deal of time. Further, the operation model for this architecture is a job queue. While the application server services one client's request, the other clients' jobs are queued until the active job is finished. If the active job takes a long time, the queued jobs are kept waiting, regardless of the job loading.

One attempt to solve this problem is a data pool model, in which, for each backend database, there is a corresponding single application server and a corresponding single channel having a respective job queue. This architecture still has disadvantages, because the executing job performance impacts the jobs waiting in the job queue.

An improved data pool manager is desired.

SUMMARY OF THE INVENTION

A method of managing access by a plurality of clients to a plurality of respectively different databases comprises the steps of: receiving a plurality of requests by the plurality of clients to access a plurality of different databases, the queries being received by a single application server; dynamically analyzing use of channel connections between the single application server and the plurality of databases; and dynamically allocating the channel connections between the single application server and each of the plurality of databases to service the plurality of queries based on the analyzing.

DETAILED DESCRIPTION

The data pool models of the prior art used a predetermined, static number of channels, in spite of the variable volume of the connection traffic. Depending on the actual traffic conditions, an individual channel allocation may have been too high or too low at different times.

An exemplary embodiment of the present invention provides an efficient middle-tier application server as a management engine for multiple database connections. The exemplary embodiment operates a data pool for each backend database independently and dynamically analyzes each database's connection activity during a relevant period, for optimizing data channel pre-allocations, to reduce unnecessary consumption of resources.

Figure 1:
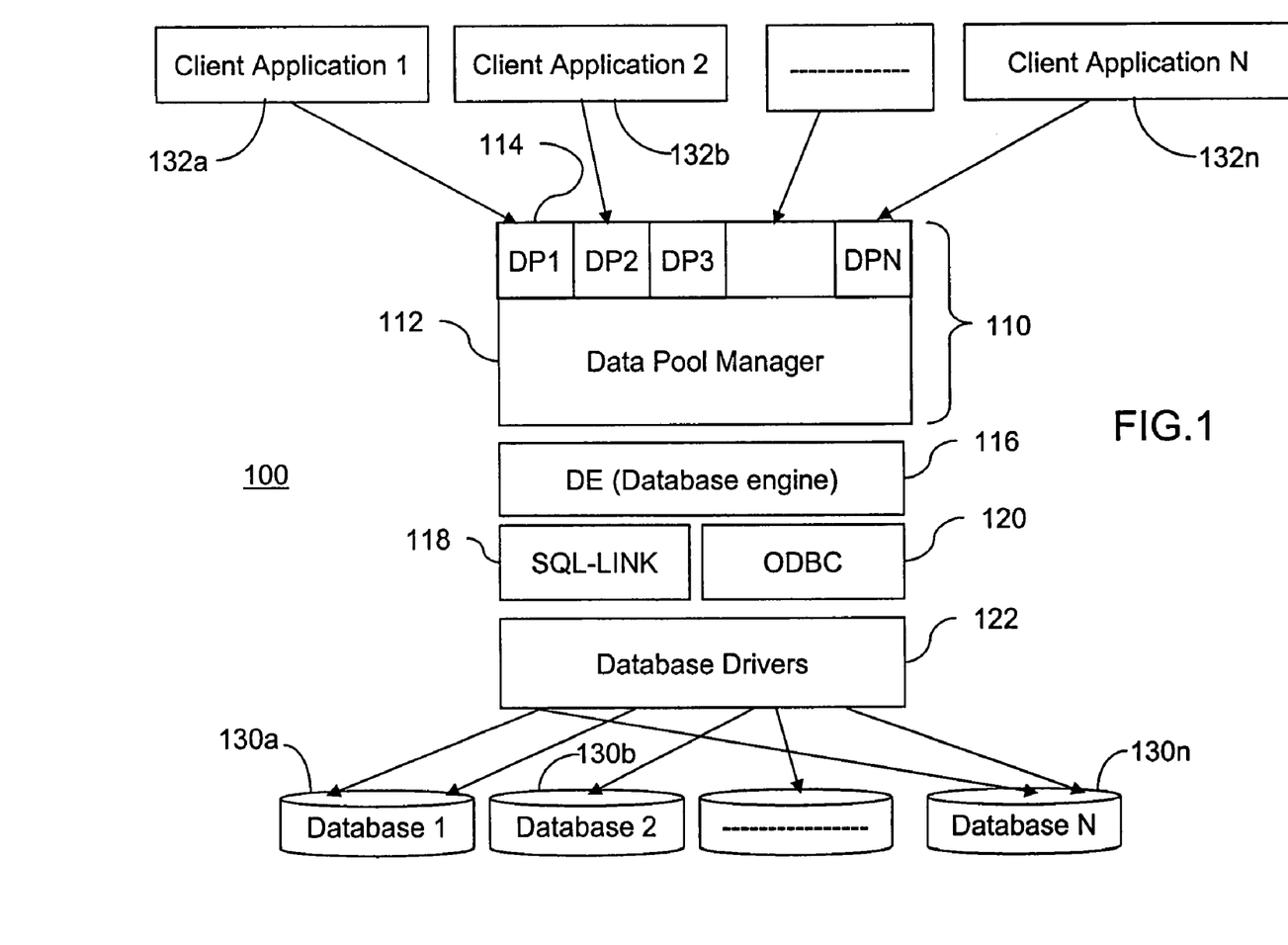
FIG. 1 is a block diagram of a system including an exemplary data pool manager.

FIG. 1 is a block diagram of an exemplary system 100 including a data pool manager 110 according to one embodiment of the present invention. In system 100, a plurality of client applications 132a–132n access databases 130a–130n, where any of the clients can access any of the databases. A plurality of requests DP1-DPN are received by the data pool manager interface 112. The data pool manager passes the requests to the database engine 116, which may be, for example, the Borland "Delphi" Database Engine or other database engine suitable for a multi-tier system. The database engine 116 passes the command to the structured query language (SQL) link layer 118 and the ODBC layer 120. The modules pass the commands to the database drivers 122 for the various databases 130a–130n.

Figure 2:
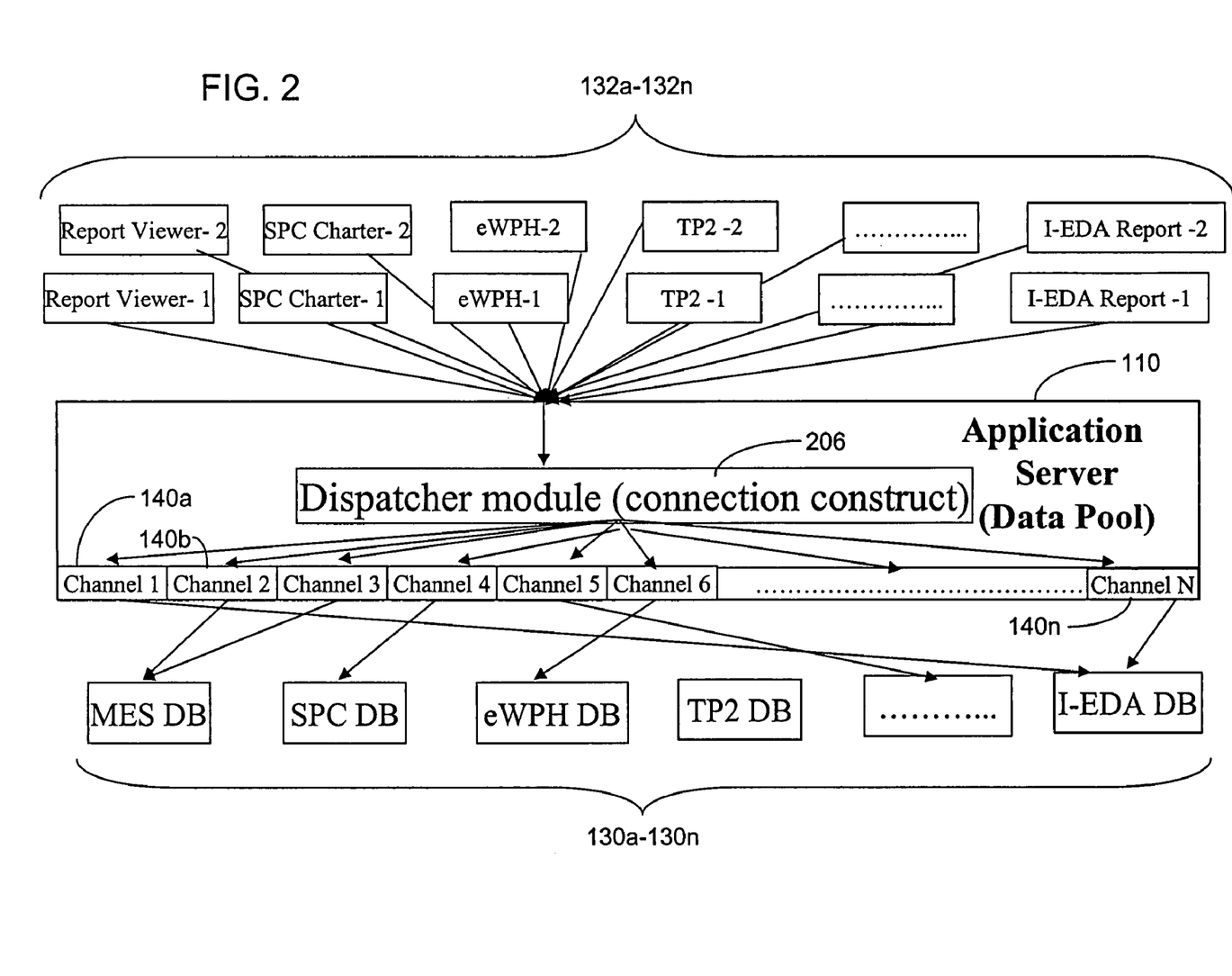
FIG. 2 is a block diagram showing the data pool manager of FIG. 1 with connections to multiple databases.

FIG. 2 shows the data pool manager of FIG. 1. A dispatcher (connection construct) module 206 assigns each request/command to one of the channels 140a–140n. In this example, the channels are allocated to specific databases 130a–130n. The data pool manager 110 periodically analyzes the usage of the channels 140a–140n, and dynamically adjusts the allocations to improve system performance based on the connection activity for each channel.

Figure 3:
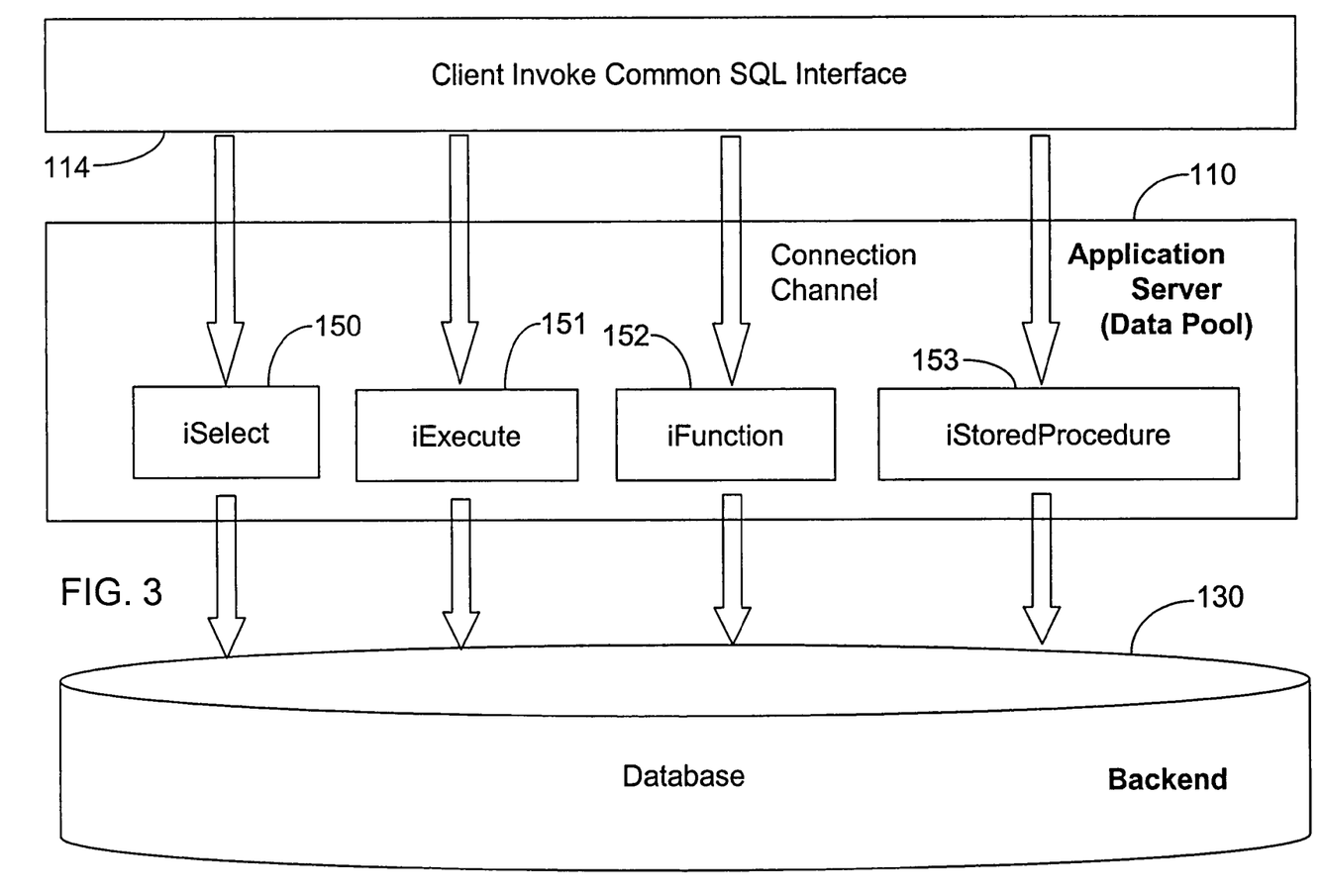
FIG. 3 is a diagram showing the commands processed by the data pool manager of FIG. 2.

FIG. 3 shows the command structure of the data pool manager 110. Each of the plurality of clients 132a–132n communicates with the data pool manager 110 by way of a common SQL interface 114. The clients use four standard commands 150–154. The iSelect command 150 is a method to pass a query SQL command to a database (e.g., select . . . from) The iExecute command 151 is a method to pass an execution SQL command to a database. (e.g., delete . . . from, update table set . . . ). The iFunction command 152 is a method to execute the stored function in a database and return its result to the client application. The iStoredProcedure command 153 is a method to execute the stored procedure in a database and return its result to the client application. Because a common application server is provided, each three-tier client application can use the same interface. This reduces the effort for programmers to code middleware, and normalizes the programming habits of the programmers.

Figure 4:
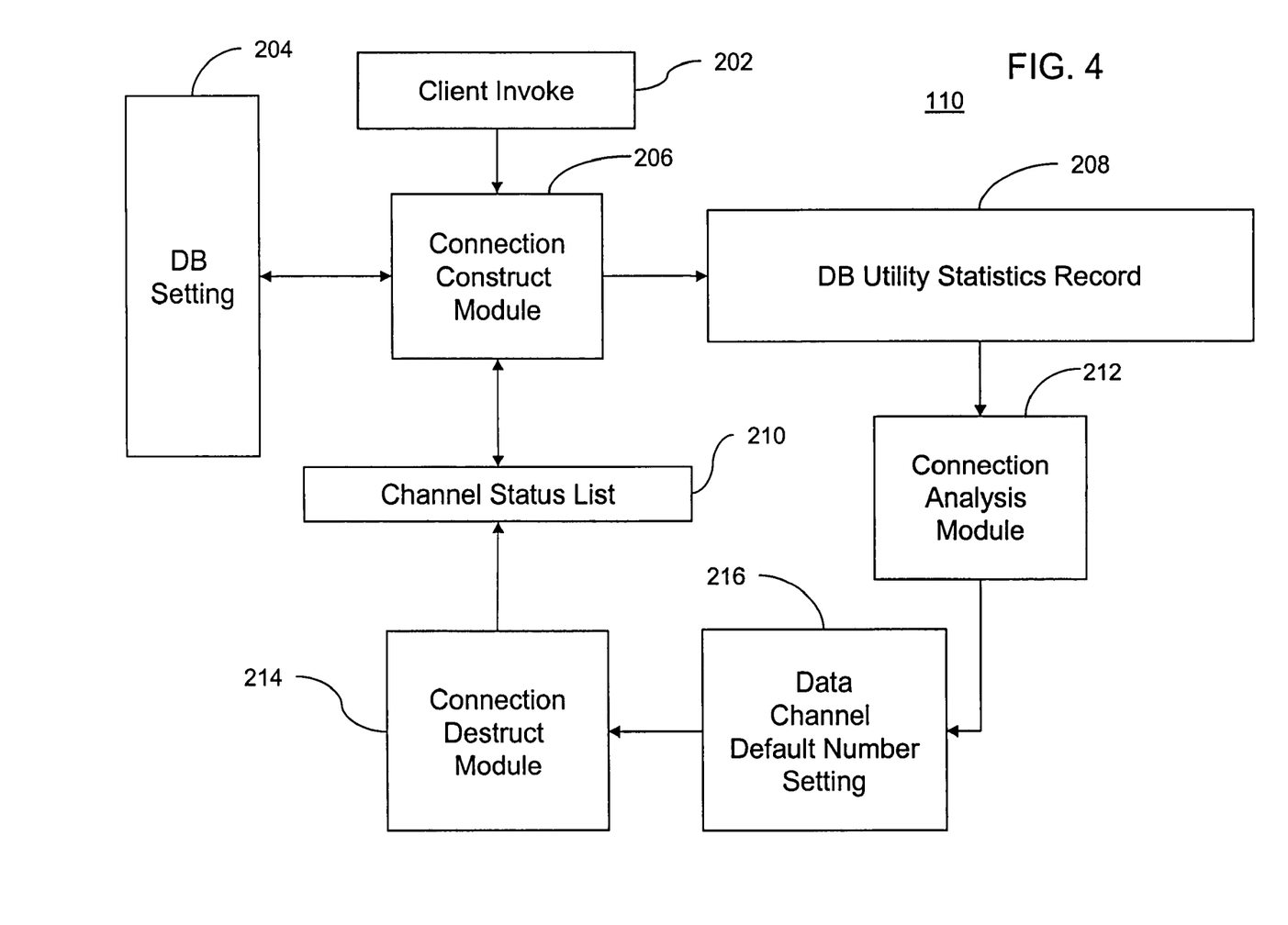
FIG. 4 is a detailed block diagram showing functions within the data pool manager of FIG. 2.

FIG. 4 is a block diagram of the data pool manager 110. The client invoke block 202 receives a plurality of requests by the plurality of clients 132a–132n to access a plurality of different databases 130a–130n. The client invoke block 202 provides a single application server for receiving queries from the clients for the plurality of databases.

The connection construct module 206 is responsible for dynamically allocating the channel connections between the single application server and each of the plurality of databases to service the plurality of queries based on the analyzing. The connection construct module 206 can assign an idle, previously-allocated channel to a request, or create a new channel and set up a database connection if no idle channel is available.

The database setting block includes an appropriate user ID and password for each respective database 130a–130n accessed by the system. The connection construct module 206 gets the user name and password from the database setting block 204, to allow the database corresponding to each received command. Thus, the individual application programs do not need to have the user ID or password.

The channel status list 210 contains the status information for each channel, for use by the connection construct module. Each channel has one of three statuses. An active channel is currently being used to service a request. An idle channel is a channel that was used at least once since it was allocated to the database to which it is currently allocated, but is not currently being used. A never-used channel has not been used to access the database to which that channel is currently allocated. Both idle channels and never-used channels are available for immediate use by the connection construct module 206 to service requests for the database to which they are allocated.

The database utility statistics record 208 is a depository for collected and calculated information about the database usage. In the exemplary embodiment, the connection construct module stores database usage and database hit ratio information in the statistics record 208. The database hit ratio for each database is defined as the number of times that an idle channel or a never-used channel is available to service a client request for that database in a given period divided by the total number of requests for that database during that period.

The connection analysis module 212 dynamically analyzes use of channel connections 140a–140n between the single application server 110 and the plurality of databases 132a–132n. Module 212 periodically retrieves the data from the database utility statistics record 208, and analyzes the data to determine an updated optimized number of channels to be allocated for each database. Module 212 establishes a default number of channels to be allocated by the single application server for each database. In some embodiments, the allocations are calculated daily. In other embodiments, the allocations may be revised more or less frequently, depending on the amount of variation in the channel usage patterns.

Referring again to FIG. 4, the connection analysis module 212 provides the revised number of channel allocations for each respective database 130a–130n to the data channel default number setting block 216.

The connection destruct module 214 periodically obtains the data channel default number settings from block 216 and performs the destruct procedure. If one of the databases currently has more channels allocated to it (at the time the destruct procedure) than the default number stored in block 216, and the extra channels have not been used for a predetermined amount of time, then the destruct module 214 reduces the number of channels assigned to that database, until the default number for that database is achieved. The channel status list is updated accordingly.

Figure 5:
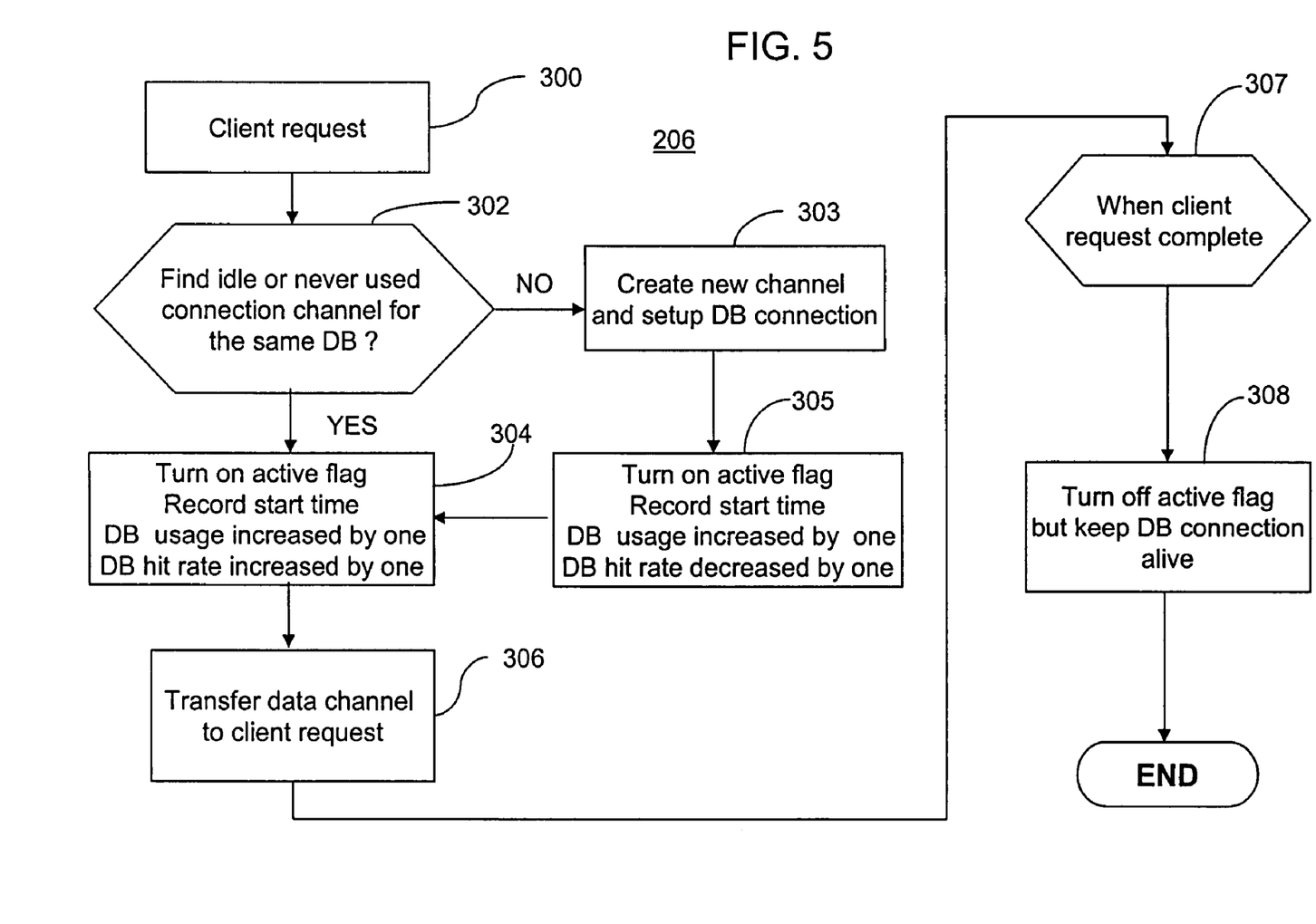
FIG. 5 is a flow chart diagram of the connection construct module of FIG. 4.

FIG. 5 is a flow chart of the process performed by the connection construct module 206.

At step 300, a client request to access one of the databases 130a–130n is received.

At step 302, connection construct module 206 checks the channel status list to determine whether there is an idle (or a never-used) connection channel available that is already allocated to the same database. If there is an idle channel already allocated to this database, then step 306 is executed next.

At step 303, if there is no available channel (i.e., all of the channels allocated to this database are currently being used at the same time), then a new channel is created and the database connection is set up. Thus, the data pool manager 110 increases the number of channels allocated to one of the databases above the default number of channels corresponding to that database, when one of the clients issues a query to that database and none of the channels currently allocated to that database is currently available.

At step 305, the active flag for the newly created channel is turned on. The start time for this channel is recorded. The start time for the addition of the channel is recorded. This enables the recording of statistics for this database to reflect the results after the addition of the channel. (By recording the start time when each link is added, the system is able to identify if the channel remains unused for a threshold period of time). The database usage is increased by one. The numerator of the database hit ratio is decreased by one, reflecting the fact that no channel was available when requested. Then step 306 is executed.

At step 306, the idle data channel (or the newly created channel) is transferred to the client request. The client's request is performed.

At step 307, the channel remains allocated to the client until the completion of the client's request and any associated response by the database.

At step 308, the channel's active flag is turned off, but the channel remains allocated to current database, at least until a periodic destruct procedure is performed (and possibly longer, if the channel is used within a predetermined period before the destruct procedure is performed).

Figure 6:
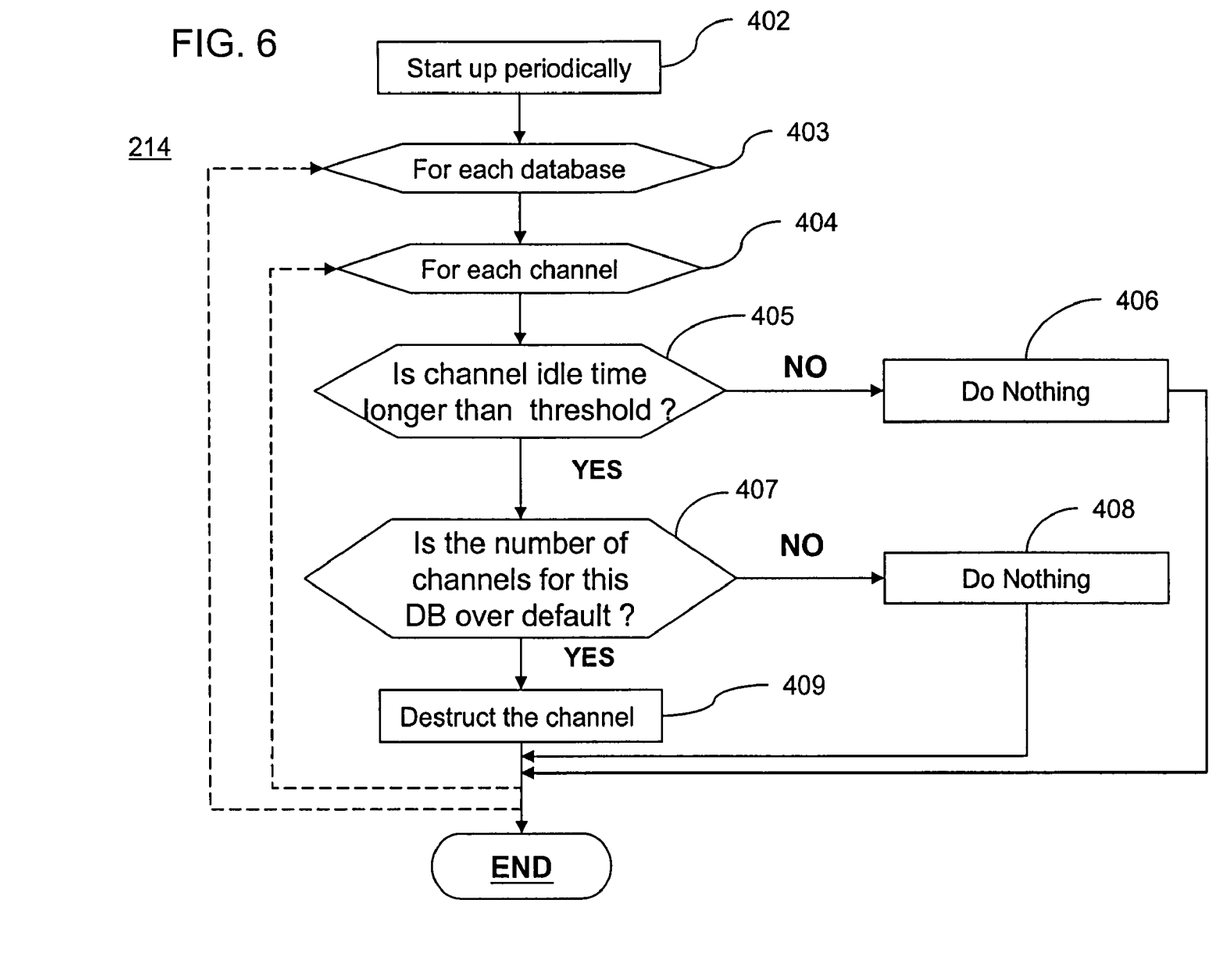
FIG. 6 is a flow chart diagram of the connection destruct module of FIG. 4.

FIG. 6 is a flow chart diagram of the destruct procedure performed by the connection destruct module 214.

At step 402, the destruct process is automatically launched periodically. The period can be determined by a system administrator. If the period is set too long, then unused channels will remain allocated for a long time, slowing down performance.

At step 403, a loop including steps 404–409 is executed for each database to which the data pool manager has access.

At step 404, a loop including steps 405–409 is executed for each channel allocated to the database for which the loop is currently being performed.

At step 405, a determination is made whether the channel idle time is longer than a predetermined threshold period. If the channel is not idle, or the channel has been idle less than the threshold period, then step 406 is performed. If the channel has been idle for at least the threshold period, step 407 is performed.

At step 406, no action is taken, and steps 407–409 are skipped for this channel. This allows the system to maintain the number of channels allocated to the one database above the default number of channels corresponding to that database for at least a predetermined period of time after increasing the number of channels above the default number of channels for that database.

At step 407, because the one channel has been idle for at least the predetermined period of time, a determination is made whether the number of channels allocated to the one database is greater than the default number of channels corresponding to that one database. If the number of channels is not greater than the default number of channels, then step 408 is performed. If the number of channels is greater than the default, step 409 is performed.

At step 408, no action is taken, and step 409 is skipped for this channel.

At step 409, where the number of channels allocated to a database exceeds the default number for that database, and the current channel has remained idle for the threshold period of time, the channel is destructed, i.e., de-allocated.

Figure 7:
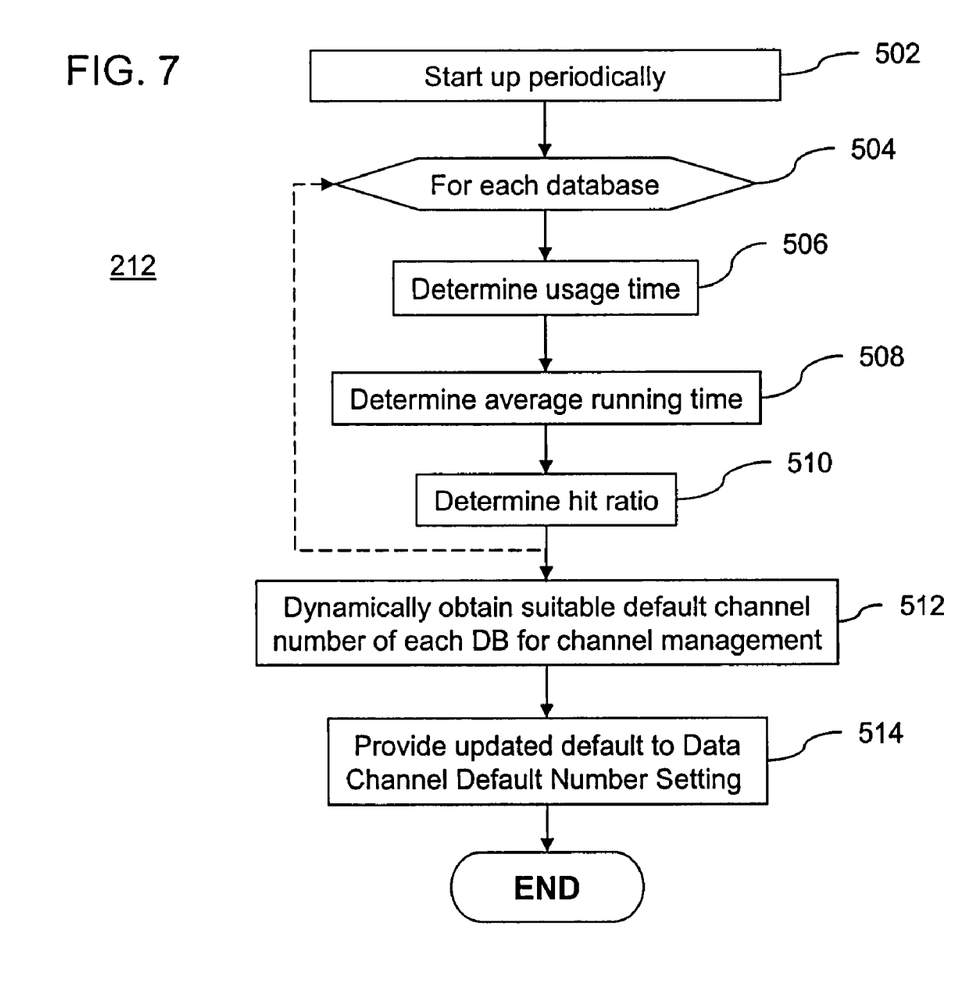
FIG. 7 is a flow chart diagram of the Data Channel Default Number Setting Control module of FIG. 4.

FIG. 7 is a flow chart diagram of the connection analysis module 212.

At step 502, the connection analysis module is launched periodically. In the exemplary embodiment, the module is launched daily, but a shorter or longer period may be used.

At step 504, a loop is performed for each database.

At step 506 the usage time for each database is determined.

At step 508, the average running time is determined as the time when the application server accesses the database during a standard period (e.g., a day), measured from the time of the client application request to the return of a database execution result to the client in response to that request.

At step 510, the hit ratio of the database is determined as the ratio of the number of requests for which a previously allocated channel was available (either idle or not previously used) at the time of the request divided by the total number of requests for that database during the standard period.

At step 512, the connection analysis module dynamically obtains a suitable default channel number of each database for channel management.

The total default number of channels allocated to all of the databases is calculated based on at least one of the group consisting of an average running time of each database and a hit ratio of each database. In the exemplary embodiment, the number of channels is determined by the equation:

$$T=(X_1-I_1)/H_1+(X_2-I_2)/H_2+\ldots+(X_D-I_D)/H_D,$$

where T is the total default number of channels, $X_i$ is the number of channels in use for database i, $I_i$ is the number of channels allocated to database i that are not used, and $H_i$ is the hit ratio of the channels for database i, and D is the number of backend databases.

Note that the total default number of channels T is the total number that is allocated based on the analysis, before any additional channels are allocated by the connection construct module due to database misses (described further below with reference to step 303 of FIG. 5). This number does not reflect the total after channels are added when a miss occurs.

Once T is determined, a respective default number of channels assigned to each database to service its daily connection activity is given by the equation:

$$N_i=T/D^*(Avg_i/Tavg)/H_i,$$

where $N_i$ is the default number of channels for database i, $Avg_i$ is an average amount of time a corresponding application server for database i accesses database i during a given period, and Tavg is a total of the average running times for all of the databases in the given period.

At step 514, the connection analysis module provides the updated data channel default number setting to the default channel management setting block. Thus, the default number of channels corresponding to one or more of the databases can be changed, based on the analyzing.

In some embodiments, when the default numbers of channels for a database increases, the additional channels are immediately allocated (in which case, the new channels remain idle until there are concurrent requests for that database in a number exceeding the previous default number for that database).

In other embodiments, no channels are immediately allocated when the default number of channels for a database increases. Instead, the connection construct module 206 waits until there are concurrent requests for that database in a number exceeding the previous default number for that database. The new channels are allocated when needed.

The exemplary data pool manager 110 described above uses a status-less model. In response to a query, the data pool manager returns all the requested data in one transmission. Thus, the exemplary application server does not cost any memory resources to maintain the data cursor for client applications. This can improve performance. Because the exemplary data manager has a respective data channel pool for each database, an increased response on a single channel (to return all of a query response at once) does not impact clients querying another database at all, and where a database is served by more than one channel, does not adversely impact other clients querying the same database either.

In other embodiments, a status based model may be used. In that case, the middleware (application server) passes a portion of the data on to the client, and maintains a data cursor to identify the next datum to be sent in response to the query. The remaining data are sent when the client scrolls down to the end of the data already received.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard disk drives, high density (e.g., ZIP™) diskettes, electrically erasable programmable ROM (EEPROM), flash memory, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of managing access by a plurality of clients to a plurality of respectively different databases, comprising the steps of:

(a) receiving a plurality of requests by the plurality of clients to access a plurality or different databases, the queries being received by a single application server;

(b) dynamically analyzing use of channel connections between the single application server and the plurality of databases; and (c) dynamically allocating the channel connections between the single application server and each of the plurality of databases to service the plurality of queries based on the analyzing by;

establishing a default number of channels to be allocated by the single application server for each database; and increasing the number of channels allocated to one of the databases above the default number of channels corresponding to that database, if one of the clients issues a query to that database and none of the channels currently allocated to that database is currently available.

2. The method of claim 1, further comprising:

maintaining the number of channels allocated to the one database above the default number of channels corresponding to that database for at least a predetermined period of time after the increasing step.

3. The method of claim 2, further comprising de-allocating one of the channels allocated to the one database if:

the one channel has been idle for at least the predetermined period of time; and the number of channels allocated to the one database is greater than the default number of channels corresponding to that one database.

4. The method of claim 1, wherein step (c) includes changing the default number of channels corresponding to at least one of the databases based on the analyzing of step (b).

5. The method of claim 1, wherein step (b) includes calculating a number of channels to assign to each database based on at least one of the group consisting of an average running time of each database and a hit ratio of each database.

6. The method of claim 5, wherein a total number of channels allocated to all of the databases is determined by the equation:

$$T=(X_1-I_1)/H_1+(X_2-I_2)/H_2+\ldots+(X_D-I_D)/H_D,$$

where T is the total number of channels, $X_i$ is the number of channels in use for database i, $I_i$ is the number of channels allocated to database i that are not used, and $H_i$ is the hit ratio of the channels for database i, and D is the number of backend databases.

7. The method of claim 6, wherein a respective number of channels assigned to each database is given by the equation:

$$N_i=T/D*(Avg_i/Tavg)/H_i,$$

where $N_i$ is the number of channels for database i, $Avg_i$ is an average amount of time a corresponding application server for database i accesses database i during a given period, and Tavg is a total of the average running times for all of the databases in the given period.

8. The method of claim 1, wherein step (a) includes receiving the plurality of requests by way of a common interface.

9. The method of claim 8, wherein the plurality of requests use structured query language.

10. A data pool manager for controlling access by a plurality of clients to a plurality of respectively different databases, comprising:

a single application server that receives a plurality of requests by the plurality of clients to access a plurality of different databases;

means for dynamically analyzing use of channel connections between the single application server and the plurality of databases; and means for dynamically allocating the channel connections between the single application server and each of the plurality of databases to service the plurality of queries based on the analyzing, including means for establishing a default number of channels to be allocated by the single application server for each database, and means for increasing the number of channels allocated to one of the databases above the default number of channels corresponding to that database, if one of the clients issues a query to that database and none of the channels currently allocated to that database is currently available.

11. The data pool manager of claim 10, wherein the allocating means maintains the number of channels allocated to the one database above the default number of channels corresponding to that database for at least a predetermined period of time after the increasing step.

12. The data pool manager of claim 11, wherein the allocating means further comprises means for de-allocating one of the channels allocated to the one database if:

the one channel has been idle for at least the predetermined period of time; and the number of channels allocated to the one database is greater than the default number of channels corresponding to that one database.

13. The data pool manager of claim 10, wherein the allocating means includes means for changing the default number of channels corresponding to at least one of the databases in response to the analyzing means.

14. The data pool manager of claim 10, wherein the analyzing means calculates a number of channels to assign to each database based on at least one of the group consisting of an average running time of each database and a hit ratio of each database.

15. The data pool manager of claim 14, wherein a total number of channels allocated to all of the databases is determined by the equation:

$$T=(X_1-I_1)/H_1+(X_2-I_2)/H_2+\ldots+(X_D-I_D)/H_D,$$

where T is the total number of channels, $X_i$ is the number of channels in use for database i, $I_1$ is the number of channels allocated to database i that are not used, and $H_i$ is the hit ratio of the channels for database i, and D is the number of backend databases.

16. The data pool manager of claim 15, wherein a respective number of channels assigned to each database is given by the equation:

$$N_i=T/D*(Avg_i/Tavg)/H_i,$$

where $N_i$ is the number of channels for database i, $Avg_i$ is an average amount of time a corresponding application server for database i accesses database i during a given period, and Tavg is a total of the average running times for all of the databases in the given period.

17. The data pool manager of claim 10, wherein the application server receives the plurality of requests by way of a common interface.

18. The data pool manager of claim 17, wherein the plurality of requests use structured query language.

19. A computer readable medium encoded with computer program code, wherein, when the computer program code is executed by a processor, the processor performs a method of managing access by a plurality of clients to a plurality of respectively different databases, comprising the steps of:

(a) receiving a plurality of requests by the plurality of clients to access a plurality of different databases, the queries being received by a single application server;

(b) dynamically analyzing use of channel connections between the single application server and the plurality of databases; and (c) dynamically allocating the channel connections between the single application server and each of the plurality of databases to service the plurality of queries based on the analyzing, wherein the dynamically allocating includes establishing a default number of channels to be allocated by the single application server for each database, and increasing the number of channels allocated to one of the databases above the default number of channels corresponding to that database, if one of the clients issues a query to that database and none of the channels currently allocated to that database is currently available.

20. The computer readable medium of claim 19, wherein the method further comprises:
maintaining the number of channels allocated to the one database above the default number of channels corresponding to that database for at least a predetermined period of time after the increasing step.

21. The computer readable medium of claim 20, wherein the method further comprises de-allocating one of the channels allocated to the one database if:
the one channel has been idle for at least the predetermined period of time; and
the number of channels allocated to the one database is greater than the default number of channels corresponding to that one database.

22. The computer readable medium of claim 19, wherein step (c) includes changing the default number of channels corresponding to at least one of the databases based on the analyzing of step (b).

23. The computer readable medium of claim 19, wherein step (b) includes calculating a number of channels to assign to each database based on at least one of the group consisting of an average running time of each database and a hit ratio of each database.

24. The computer readable medium of claim 23, wherein a total number of channels allocated to all of the databases is determined by the equation:

$$T=(X_1-I_1)/H_1+(X_2-I_2)/H_2+\ldots+(X_D-I_D)/H_D,$$

where T is the total number of channels, $X_i$ is the number of channels in use for database i, $I_1$ is the number of channels allocated to database i that are not used, and $H_i$ is the hit ratio of the channels for database i, and D is the number of backend databases.

25. The computer readable medium of claim 24, wherein a respective number of channels assigned to each database is given by the equation:

$$N_i=T/D*(Avg_i/Tavg)/H_i,$$

where $N_i$ is the number of channels for database i, $Avg_i$ is an average amount of time a corresponding application server for database i accesses database i during a given period, and Tavg is a total of the average running times for all of the databases in the given period.

26. The computer readable medium of claim 19, wherein step (a) includes receiving the plurality of requests by way of a common interface.

27. The computer readable medium of claim 26, wherein the plurality of requests use structured query language.

* * * * *